US006389704B1

(12) United States Patent
Johnson et al.

(10) Patent No.: US 6,389,704 B1
(45) Date of Patent: May 21, 2002

(54) THREAD RING GAUGE HOLDER WITH TORQUE CONTROL

(76) Inventors: Timothy M. Johnson; Kevin M. Chatfield, both of 6589 Sutter Dr., Roscoe, IL (US) 61073

( * ) Notice: Subject to any disclaimer, the term of this patent is extended or adjusted under 35 U.S.C. 154(b) by 0 days.

(21) Appl. No.: 09/664,099

(22) Filed: Sep. 19, 2000

(51) Int. Cl.[7] .................................................. G01B 3/34
(52) U.S. Cl. .............................. 33/501.08; 33/501.05; 33/199 R
(58) Field of Search ........................ 33/501.05, 501.08, 33/501.45, 501.7, 501.11, 501.19, 199 R, 815

(56) References Cited

U.S. PATENT DOCUMENTS

| | | | | |
|---|---|---|---|---|
| 2,582,679 A | * | 1/1952 | Carroll | 33/501.45 |
| 2,933,320 A | * | 4/1960 | Lyons | 33/501.7 |
| 3,229,374 A | | 1/1966 | Comorau | 33/199 |
| 3,270,427 A | * | 9/1966 | Johnson | 33/199 R |
| 3,314,155 A | | 4/1967 | Lavallee | 33/147 |
| 3,872,602 A | | 3/1975 | Kennedy et al. | 33/199 R |
| 4,213,247 A | * | 7/1980 | Romine | 33/199 R |
| 4,335,518 A | | 6/1982 | Reef | 33/199 R |
| 4,501,070 A | | 2/1985 | Liles | 33/199 R |
| 4,934,059 A | | 6/1990 | Green | 33/199 R |
| 5,134,783 A | | 8/1992 | Perry | 33/645 |
| 5,377,417 A | | 1/1995 | Sentman | 33/199 R |
| 5,383,286 A | | 1/1995 | Kipnes | 33/829 |
| 5,490,333 A | * | 2/1996 | Nelson et al. | 33/199 R |
| 5,495,677 A | * | 3/1996 | Tachikake et al. | 33/815 |

\* cited by examiner

*Primary Examiner*—Diego Gutierrez
*Assistant Examiner*—Madeline Gonzalez
(74) *Attorney, Agent, or Firm*—Richard C. Litman

(57) ABSTRACT

A thread ring gauge holder that is used with a thread ring gauge to eliminate the variance in applied torque from different people using the thread ring gauge. This device allows the thread ring gauge to be protected from an excessive amount of torque and from a premature false reading from applying too little torque from a wide variety of users. The device can be used together with a variety of thread ring gauges and is made up of a ring gauge adapter, a ratchet drive, a ratchet gear, a protective housing that accommodates a ball plunger and a pawl device and a snap ring to hold the thread ring gauge holder together in place with the thread ring gauge. The ball plunger and pawl act as a torque setting device to control the amount of torque that is applied to the thread ring gauge, thereby insuring repeatability and consistency.

7 Claims, 7 Drawing Sheets

THREAD RING GAUGE HOLDER WITH TORQUE CONTROL

BACKGROUND OF THE INVENTION

1. Field of the Invention

The present invention relates to a thread ring gauge holder for a thread ring gauge that controls the amount of torque put on the threads and the thread ring gauge.

2. Description of the Related Art

Testing the threads on a bolt or screw can be an important part of the reliability of an entire piece of equipment or machinery. It is well-known to those schooled in the related art to use a thread ring gauge to measure the threads on a bolt or screw.

As indicated by the following patents, the related art illustrates a variety of thread ring gauges and accessories that can be used to measure the threads on a bolt or screw.

U.S. Pat. No. 3,229,374 issued to Comorau outlines the use of an external thread ring gauge that incorporates an easily replaceable, economical thread providing element. When the element becomes worn unduly, it may readily be removed and replaced by a new one at a cost which is a relatively small fraction of that which would be involved in replacing the entire gauge.

U.S. Pat. No. 3,314,155 issued to Lavallee outlines the use of a micrometer which is adapted to measure inside and outside diameters of thread members that are provided with various types of threads as well as the lead angle and helix angle of the thread provided to thread members and pitch diameter of gear teeth.

U.S. Pat. No. 3,872,602 issued to Kennedy et al. outlines the use of a thread ring gauge for checking a thread part for defective threads. The gauge is particularly well suited for the mass production checking of thread fasteners on an individual basis. The thread ring gauge has a scissors probe which moves along the thread being checked. When a defect is encountered, the probe pivots to indicate the presence of a defect and a switch detects this pivotal movement and provides a signal to the user.

U.S. Pat. No. 4,335,518 issued to Reef outlines a thread gauging instrument for gauging external threads on thread members. The instrument has great versatility making it possible to check pitch diameter, lead drunkenness and other screw characteristics. The instrument provides an anvil on which the thread member to be gauged is seated and can be readily pivoted to accommodate different thread leads.

U.S. Pat. No. 4,934,059 issued to Green outlines a gauge for measuring threads of varying pitch by screwing a thread gauge element into engagement with a thread of varying pitch and to a point at which the threads have a light binding relationship, thereby resisting further advancement of the threads together. The invention may be applied to the measurement of either internal or external threads but is effectively used for gauging internal threads.

Although each of the devices outlined in the previously discussed patents are useful, what is really needed is a device that allows the thread ring gauge to be protected from an excessive amount of torque and from a premature false reading from applying too little torque. This device would be set for a given amount of torque applied to the thread ring gauge and would easily indicate to the user when the proper amount of torque is applied. Furthermore, the device should not allow the device to apply additional torque once the proper amount of torque is applied, thereby assuring repeatability of the thread ring gauge.

None of the above inventions and patents, taken either singularly or in combination, is seen to describe the instant invention as claimed. Thus a thread ring gauge holder with torque control solving the aforementioned problems is desired.

SUMMARY OF THE INVENTION

The invention is a thread ring gauge holder that is used with a thread ring gauge to eliminate the variance in applied torque from different people using the thread ring gauge. This device allows the thread ring gauge to be protected from an excessive amount of torque and from a premature false reading from applying too little torque from a wide variety of users. The device can be used together with a variety of thread ring gauges and is made up of a ring gauge adapter, a ratchet drive, a ratchet gear, a protective housing that accommodates a ball plunger and a pawl device and a snap ring to hold the thread ring gauge holder together in place with the thread ring gauge. The ball plunger and pawl act as a torque setting device to control the amount of torque that is applied to the thread ring gauge, thereby insuring repeatability and consistency.

Accordingly, it is a principal object of the invention to provide a device that eliminates overtightening of a thread ring gauge, thereby increasing the life and accuracy of the thread ring gauge.

It is another object of the invention to provide a device that controls the amount of torque that is put on thread ring gauges, thereby reducing scrap amounts.

It is a further object of the invention to provide a device that adapts to many sizes of thread ring gauges, thereby allowing many thread sizes to be check with the thread ring gauge holder.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
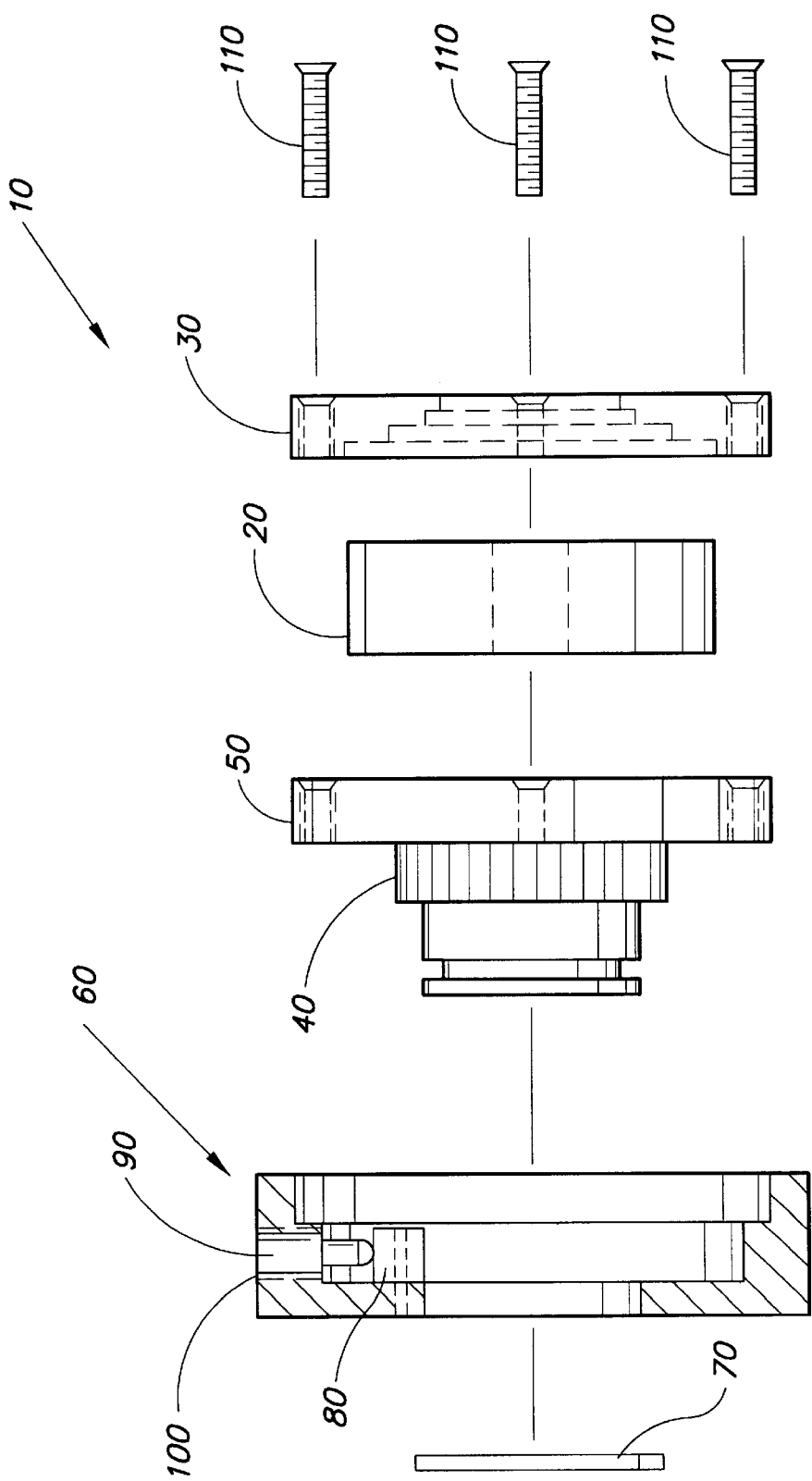
FIG. 1 a side perspective view of a thread ring gauge holder with torque control according to the present invention.

The present invention is a thread ring gauge holder 10 used to control the torque exerted on a thread ring gauge 20, as shown in FIG. 1.

The thread ring gauge holder 10 comprises a ring gauge adapter 30 used to hold a thread ring gauge 20 and a ratchet gear 40 to fit into a ratchet drive 50 with the ring gauge adapter 30 having an attaching means for attaching the ring gauge adapter 30 to the ratchet drive 50. The ratchet drive 50 is placed into a housing 60 and secured by a snap ring 70. A pawl 80 is then mounted into the housing 60 adjacent to a ball plunger 90, with the ball plunger 90 screwed into a threaded aperture 100 on the housing 60, which is used to set tension against the pawl 80 and the ratchet gear 40.

Figure 2:
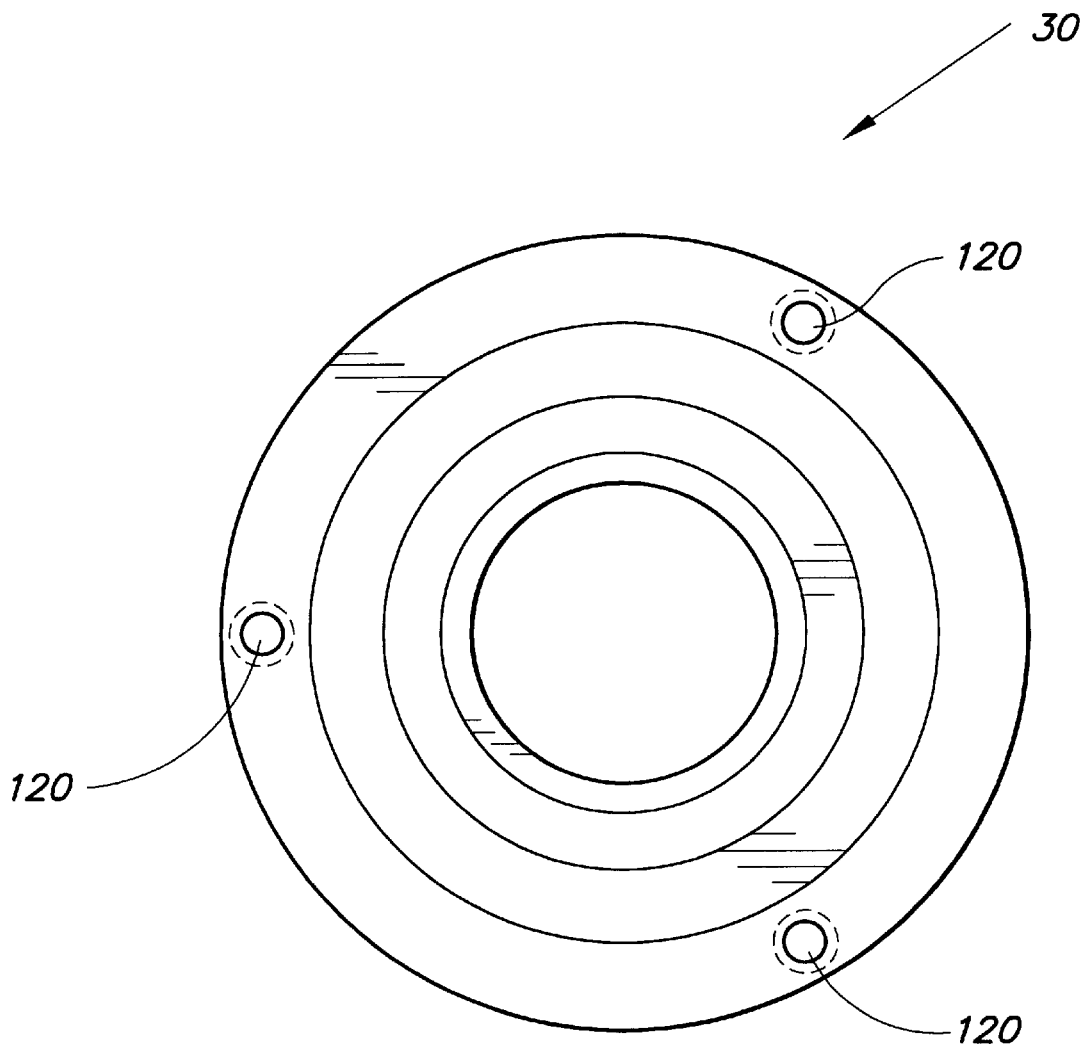
FIG. 2 is a front perspective view of a ring gauge adapter according to the present invention.

The thread ring gauge holder 10 has an attaching means for attaching the ring gauge adapter 30 to the ratchet drive 50, which are 3 cap screws 110. The ring gauge adapter 30, has a plurality of 3 apertures 120 to accommodate the cap screws 110 for attaching the ring gauge adapter 30 to the ratchet drive 50, as shown in FIG. 2. These cap screws 110 are inserted through the thread ring adapter 30 and into a plurality of apertures 140 (FIG. 4) provided on the ratchet drive 50, with the thread ring gauge 20 being fit between the ratchet drive 50 and the ring gauge adapter 30. As is also shown in FIG. 2, the ring gauge adapter 30 is internally tiered to hold and accommodate thread ring gauges 20 of a plurality of different diameters.

Figure 3:
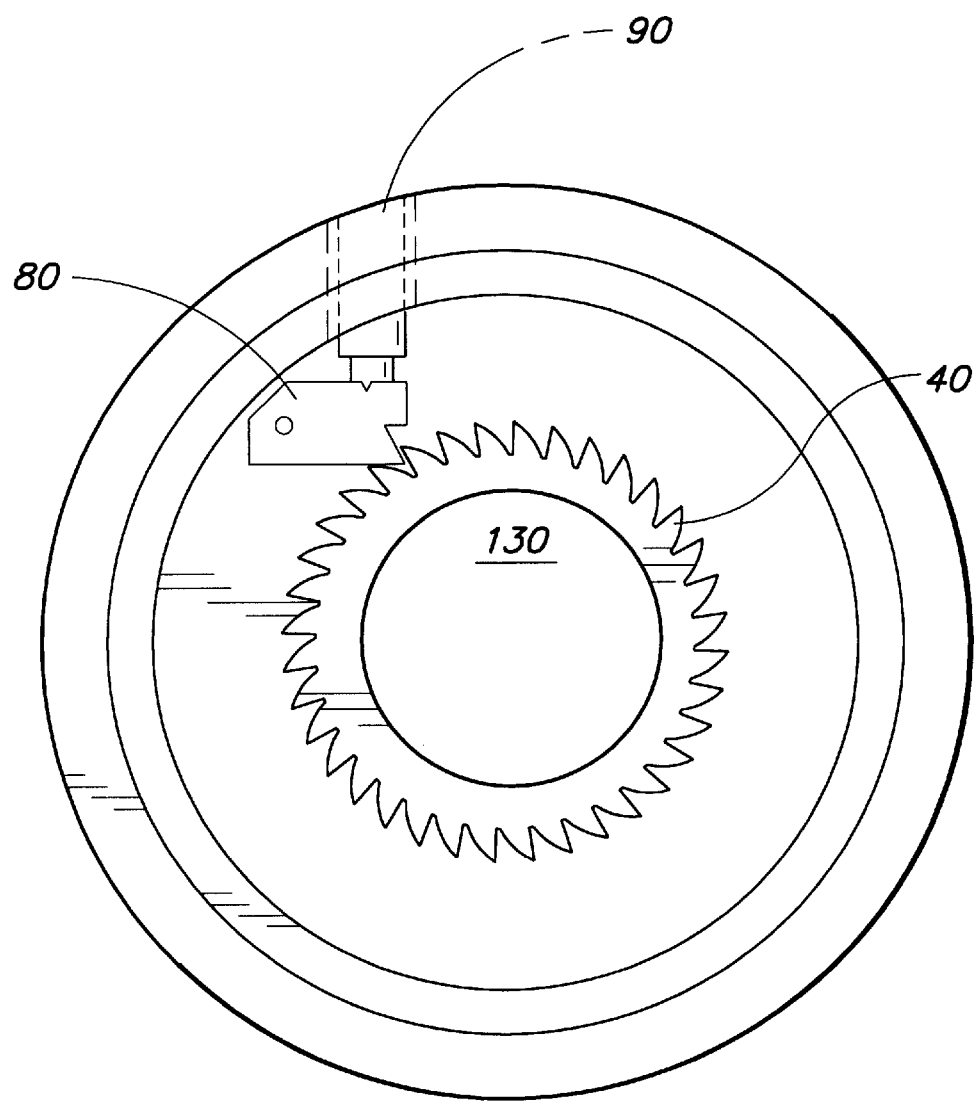
FIG. 3 is a front perspective view of a toothed ratchet gear and pawl according to the present invention.

The ratchet gear 40 is attached onto the horizontal protuberance 130 of the ratchet drive 50 and is pushed flush against the back of the ratchet drive 50. The horizontal protuberance 130 is fitted into and through the housing 60 with the ratchet gear 40 making contact with the pawl 80 while inserted in the housing 60 with the ratchet drive 50. This is shown in FIG. 3, in addition to the spatial arrangement between the pawl 80 and the ball plunger 90, which is elaborated on in more detail in the discussion of FIG. 7.

Figure 4:
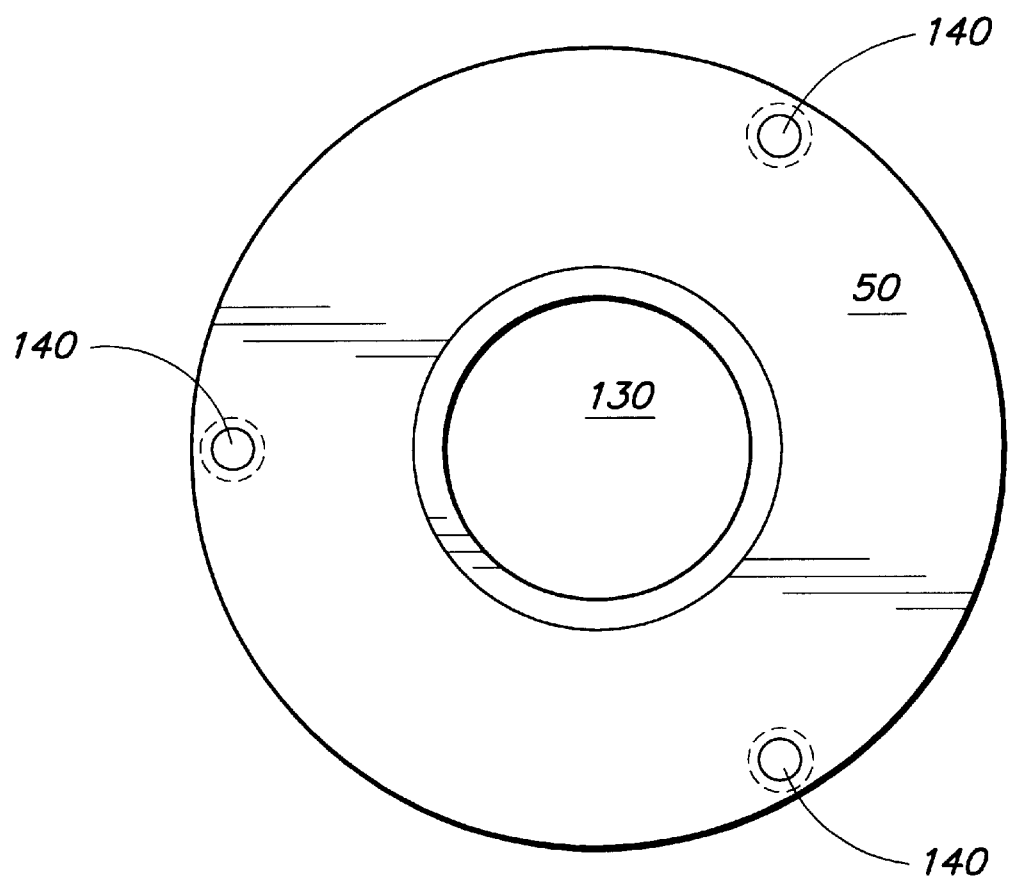
FIG. 4 is a front perspective view of the ratchet drive and cap screws according to the present invention.

As mentioned earlier, a plurality of apertures 140 are provided on the ratchet drive 50 to receive the cap screws 110 extending from the ring gauge adapter 30. These apertures 140 are illustrated in FIG. 4. Although the cap screws 110 actually extend through the apertures 120 of the ring gauge adapter 30, they do not physically extend through the apertures 140 on the ratchet drive 50. The cap screws 110 are threaded, as are all of the apertures 140 on the ring gauge adapter 30 and on the ratchet drive 50, and extend approximately halfway into the thickness of the ratchet drive 50.

Figure 5:
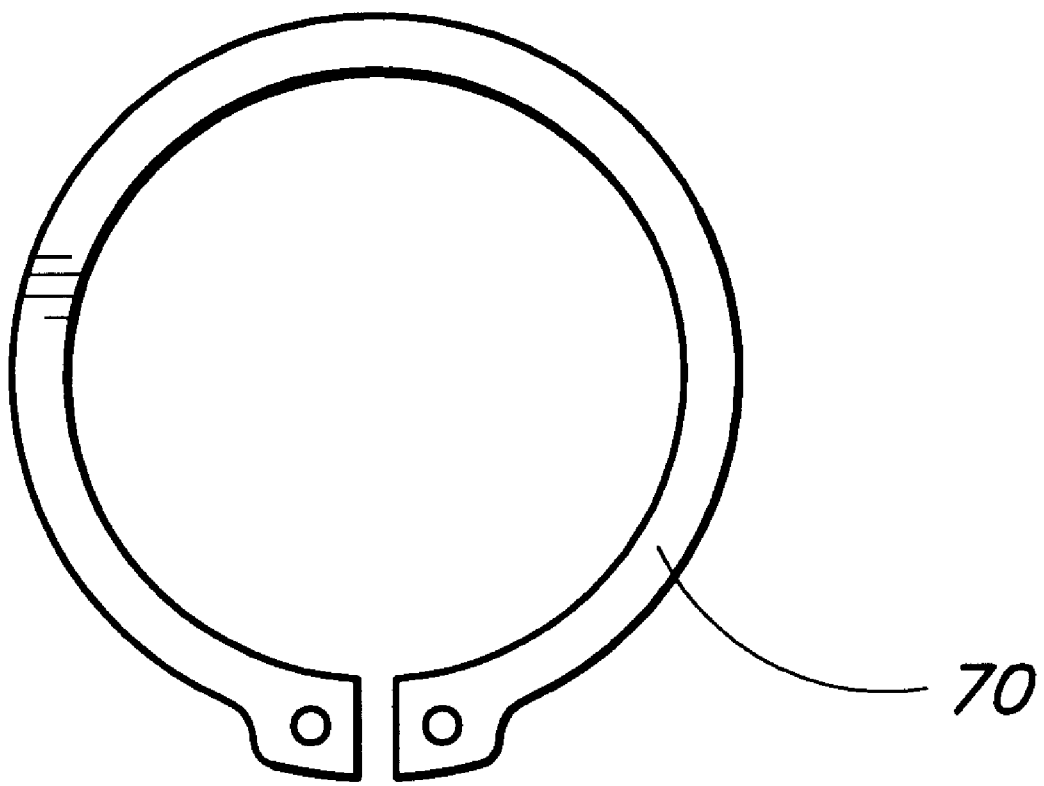
FIG. 5 is a front perspective view of a snap ring according to the present invention.

FIG. 5 illustrates the snap ring 70 used to hold the various components of the thread ring gauge holder 10 in place. A groove (not shown) is provided near the end of the horizontal protuberance 130 to accommodate the snap ring 70. The snap ring 70 is placed around the horizontal protuberance 130 by hand and is not novel to one who is schooled in the art of this type of technology.

Figure 6:
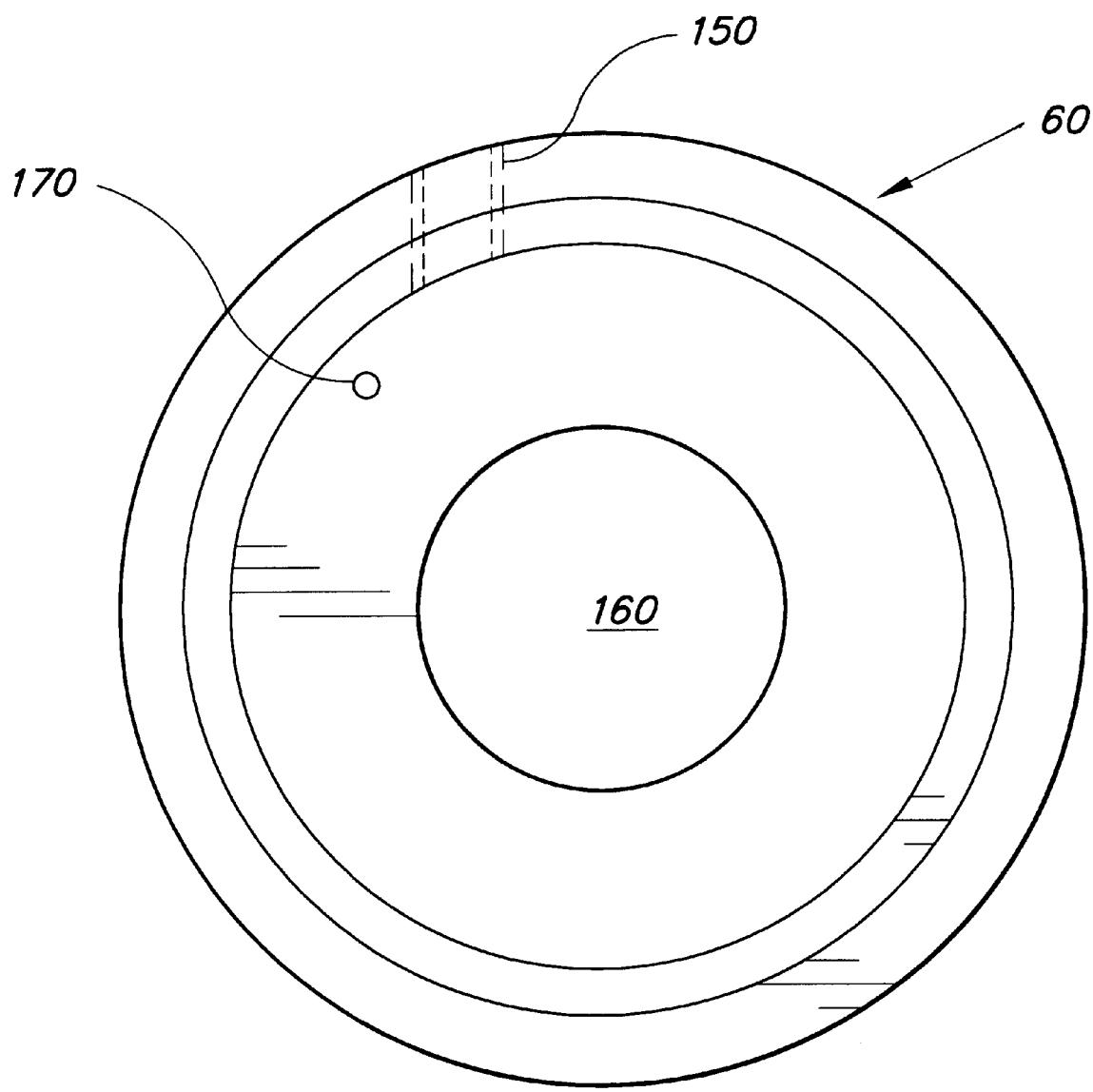
FIG. 6 is a front perspective view of a housing according to the present invention.

FIG. 6 illustrates the housing 60, the ball plunger aperture 150, the interior passageway 160 and the dowel aperture 170. As indicated earlier, these components include the ball plunger 90 and the pawl 80. The ball plunger 90 is screwed into the housing 60 and is used to set the tension between the pawl 80 and the ratchet gear 40. An aperture 150 to accommodate the ball plunger 90 is set on top of the housing 60 and is threaded downward towards the interior passageway 160 of the housing 60. An additional aperture 170 is provided on the housing 60 to accommodate a dowel (not shown) to hold the pawl 80 off center and allow the pawl 80 to toggle on the ratchet gear 40, as previously shown on FIG. 3.

Figure 7:
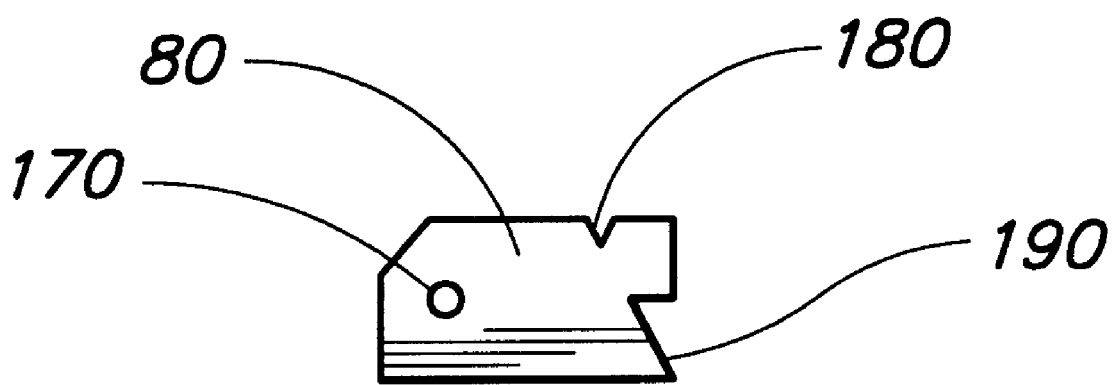
FIG. 7 is a front perspective view of a pawl according to the present invention.

FIG. 7 depicts several important features of the pawl 80. A dimple 180 is provided on top of the pawl 80 and is the point where the tip of the ball plunger 90 makes contact with the pawl 80. A triangular section 190 is cut out of a corner of the pawl 80 and is the point where the teeth of the ratchet gear 40 make contact with the pawl 80. An approximate 70 degree angle is formed with the removed triangular section 190 that is mated with the teeth of the ratchet gear 40.

The thread ring gauge holder 10 is designed to be used with a thread ring gauge 20. A thread ring gauge 20 is secured in the thread ring gauge holder 10 between the ring gauge adapter 30 and ratchet drive 50. The thread ring gauge holder 10 works like a micrometer thimble in that when the proper amount of torque is applied to the thread ring gauge 20, the threaded ring gauge holder 10 will click and not allow the thread ring gauge 20 to advance. The thread ring gauge holder 10 has a right-handed embodiment and a left-handed embodiment to accommodate right-handed and left-handed gauges.

It is to be understood that the present invention is not limited to the embodiment described above, but encompasses any and all embodiments within the scope of the following claims.

We claim:

1. A thread ring gauge holder device used to control the torque exerted on a thread ring gauge, comprising:
   a ring gauge adapter used to hold a thread ring gauge,
   a ratchet gear and a rachet drive, said rachet gear fit into said ratchet drive, the ring gauge adapter having an attaching means for attaching the ring gauge adapter to the ratchet drive;
   a housing and a thread aperture on the housing;
   the ratchet drive being placed into and through said housing and a snap ring securing the rachet drive;
   a ball plunger; and
   a pawl mounted into the housing adjacent to said ball plunger;
   said ball plunger screwed into a thread aperture on the housing, which is used to set tension against the pawl and said ratchet drive.

2. The device according to claim 1, wherein said attach means for attaching the ring gauge adapter to the ratchet drive cap screws.

3. The device according to claim 1, wherein said ring gauge adapter is internally tiered to hold and accommodate thread ring gauges of a plurality of different diameters.

4. The device according to claim 2, wherein said ring gauge adapter has a plurality of apertures to accommodate the cap screws for attaching the ring gauge adapter to the ratchet drive.

5. The device according to claim 1, wherein said ratchet gear makes contact with the pawl while inserted in the housing with the ratchet drive.

6. The device according to claim 2, wherein said ratchet drive has a plurality of apertures to accommodate the cap screws for attaching the ring gauge adapter to the ratchet drive.

7. The device according to claim 1, wherein the tip of the ball plunger makes contact on the pawl at a dimple provided on the pawl.

* * * * *